United States Patent [19]

Krude et al.

[11] Patent Number: 5,330,095
[45] Date of Patent: Jul. 19, 1994

[54] METHOD OF ASSEMBLING A UNIVERSAL JOINT

[75] Inventors: Werner Krude, Neunkirchen; Peter Harz, Hennef, both of Fed. Rep. of Germany

[73] Assignee: GKN Automotive AG, Siegburg, Fed. Rep. of Germany

[21] Appl. No.: 105,400

[22] Filed: Aug. 12, 1993

[30] Foreign Application Priority Data

Aug. 17, 1992 [DE] Fed. Rep. of Germany ....... 4227810

[51] Int. Cl.$^5$ ............................................. B23K 31/02
[52] U.S. Cl. .................................... 228/177; 228/176; 29/898.043
[58] Field of Search ............... 228/114, 176, 177, 198, 228/2.1; 29/898, 898.04, 898.043

[56] References Cited

U.S. PATENT DOCUMENTS

| 4,414,046 | 11/1983 | Palmer | 156/73.5 |
| 4,733,814 | 3/1988 | Penman | 228/2.3 |
| 4,968,287 | 11/1990 | Jacob . | |

FOREIGN PATENT DOCUMENTS

| 3739867 | 3/1990 | Fed. Rep. of Germany . |
| 1418233 | 3/1965 | France . |
| 2523672 | 3/1983 | France . |
| 0242131 | 8/1986 | Japan . |

Primary Examiner—Samuel M. Heinrich

[57] ABSTRACT

A constant velocity universal joint designed as a fixed or plunging joint permits the use of balls with a larger diameter, with the selectable shaft diameter not being adversely affected by using such balls with a larger diameter. The objective is achieved in that, in a first operation, the inner joint part is assembled with the cage while being pivoted at an angle of up to 90° and that, subsequently, in a second operation, the inner joint part is welded to an associated shaft.

10 Claims, 4 Drawing Sheets

METHOD OF ASSEMBLING A UNIVERSAL JOINT

FIELD OF THE INVENTION

The invention relates to a method of assembling a constant velocity universal joint designed as a fixed or plunging joint and consisting of a bell-shaped outer joint part comprising a hollow space and uniformly circumferentially distributed outer running grooves; of an inner joint part comprising inner running grooves corresponding to the outer running grooves; and of torque transmitting balls received in the outer and inner running grooves and held in the windows of a cage arranged between the outer joint part and the inner joint part.

BACKGROUND AND SUMMARY OF THE INVENTION

In the case of ball joints, the geometric load bearing factor, GT, enters in by the power of two. This is the reason why, especially with joints having less than the standard 6 balls, attempts are made to use balls with a larger diameter. In order to permit the inner joint part to be pivotable relative to the cage, the shaft, via a profiled journal, is normally inserted into a corresponding bore of the inner joint part.

However, there is a disadvantage in that the space available for the bore is reduced (FR-PS 1 418 233) as the size of the balls are increased. As a result, the torque transmitting capacity of the constant velocity joint is greatly reduced.

It is the object of the present invention to provide a constant velocity universal joint which comprises balls with larger diameters and in the case of which the transferable torque is not adversely affected.

In accordance with the present invention, the objective is achieved in that, in a first operation, the inner joint part and the cage are assembled at a relative pivot angle of up to 90° and that subsequently, in a second operation, starting with the pre-assembled unit, the inner joint part is welded to an associated shaft.

The advantage of the method in accordance with the present invention consists in that the shaft diameter may be selected so as to correspond to the core diameter of the inner joint part.

In an advantageous embodiment of the present invention, the inner joint part and the shaft are connected to one another by friction welding.

With this friction welding process, the pre-assembled unit, including the balls, may be accommodated in an outer joint part or in a device corresponding to an outer joint part and serving to provide torque support.

According to a further feature of the present invention, the inner joint part and the shaft are connected to one another by laser welding.

The advantage of this laser welding method is that weld splatter is avoided without fail.

In a further embodiment of the present invention it is proposed that the inner joint part and the shaft should be connected to one another by electron beam welding.

This electron beam welding process, too, has the advantage of avoiding weld splatter without fail.

According to a further embodiment of the invention, the connecting end of the shaft, for welding purposes, is provided with a centrally arranged recess. The advantage of such a recess is that in the course of welding, friction is avoided in the center of the connection between the inner joint part and the shaft. This design also ensures that the shaft heats up more quickly than the inner joint part, as a result of which structure transformation in the region of the ball running grooves is avoided.

BRIEF DESCRIPTION OF THE DRAWINGS

Below the present invention will be explained with reference to various embodiments illustrated in the drawings, wherein.

DETAILED DESCRIPTION OF THE PREFERRED EMBODIMENT

Figure 1A:
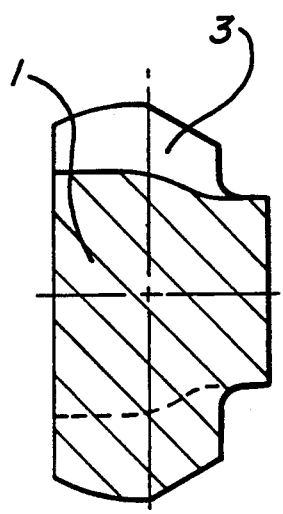
FIG. 1a is a longitudinal section through an inner joint part.

FIG. 1a is a longitudinal section through an inner joint part 1 in accordance with the invention.

Figure 1B:
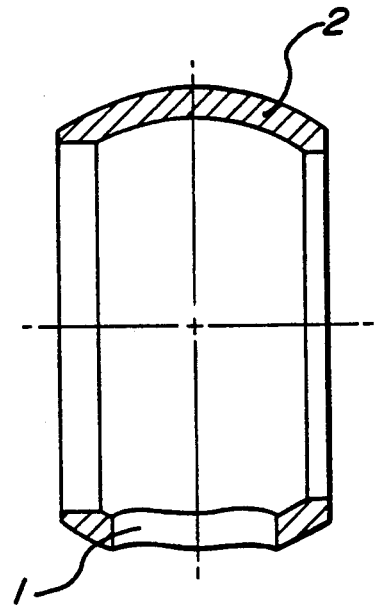
FIG. 1b is a longitudinal section through a cage.

FIG. 1b is a longitudinal section through the associated cage 2.

Figure 2:
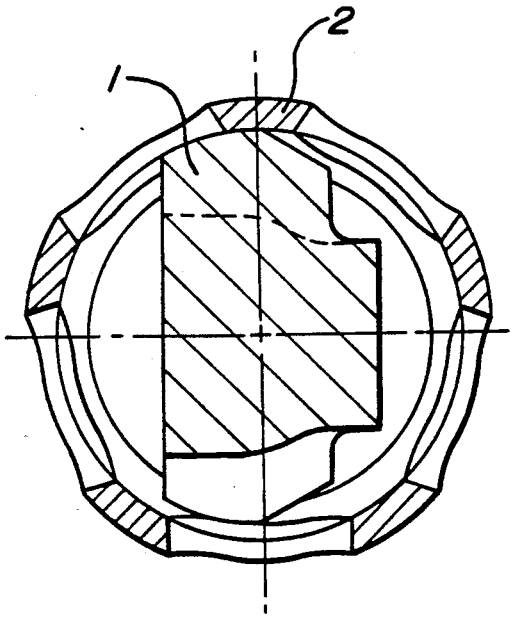
FIG. 2 shows the cage and the inner joint part in positions where, for assembly purposes, they are pivoted by 90° relative to one another.

FIG. 2 shows the cage 2 and the inner joint part 1 in positions, where for assembly purposes, they are pivoted by 90° relative to one another.

Figure 3:
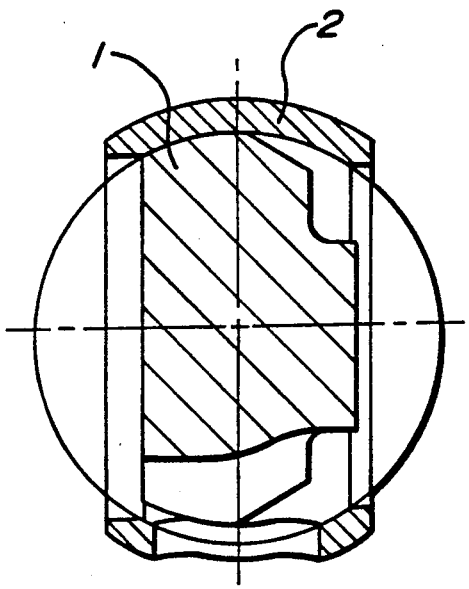
FIG. 3 shows the pre-assembled unit consisting of the inner joint part and cage.

FIG. 3 shows the inner joint part 1 and the cage 2 in positions where they are ready for assembly with a shaft 5 or an outer joint member 6.

Figure 4:
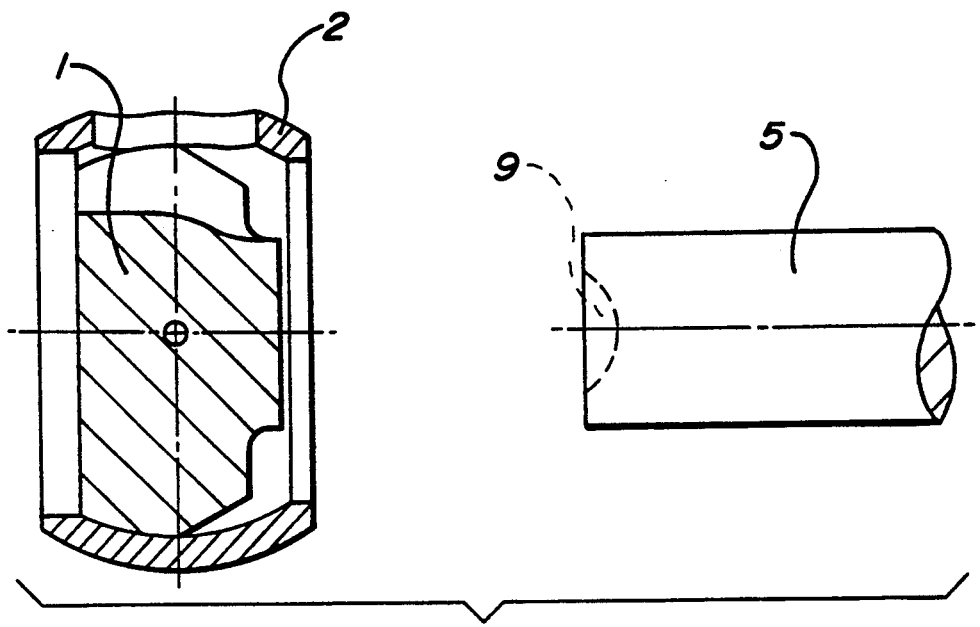
FIG. 4 shows the pre-assembled unit and shaft prior to the welding operation.

FIG. 4 shows the pre-assembled unit and the shaft 5 prior to being welded together. FIG. 4 also illustrates the centrally arranged recess 9 which is particularly advantageous for friction welding purposes.

Figure 5:
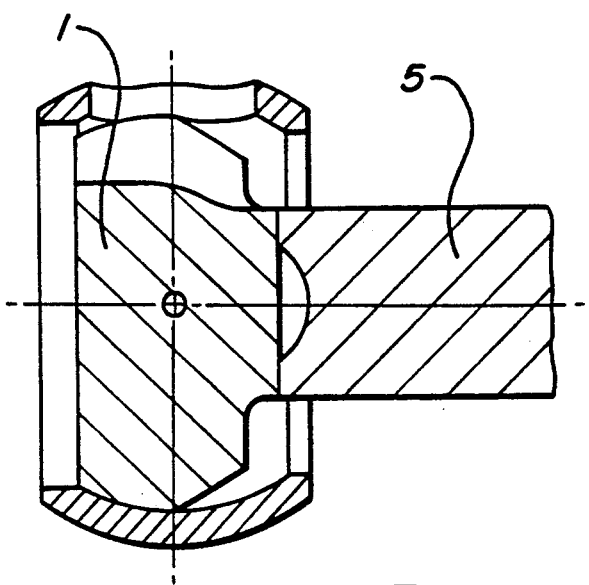
FIG. 5 shows the pre-assembled unit after the shaft has been welded thereto.

FIG. 5 shows the connection between the inner joint part 1 and the shaft 5 after completion of the welding process.

Figure 6:
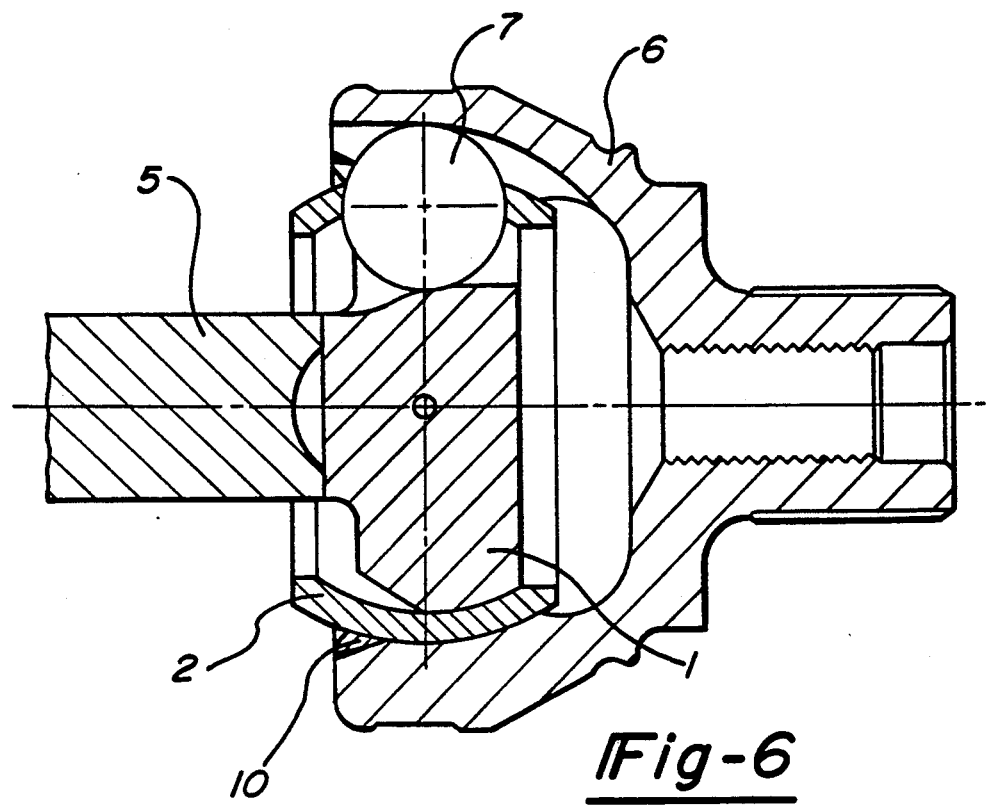
FIG. 6 is a longitudinal section through a complete constant velocity universal joint.

FIG. 6 is a longitudinal section through a complete constant velocity universal joint comprising the inner joint part 1 welded to the shaft 5, the cage 2 and the outer joint part 6 as well as balls 7 inserted into windows 4 and ball grooves 3. In the case of this constant velocity universal joint, the cage 2 is axially outwardly secured by wedges 10 inserted between the outer running grooves.

Figure 7:
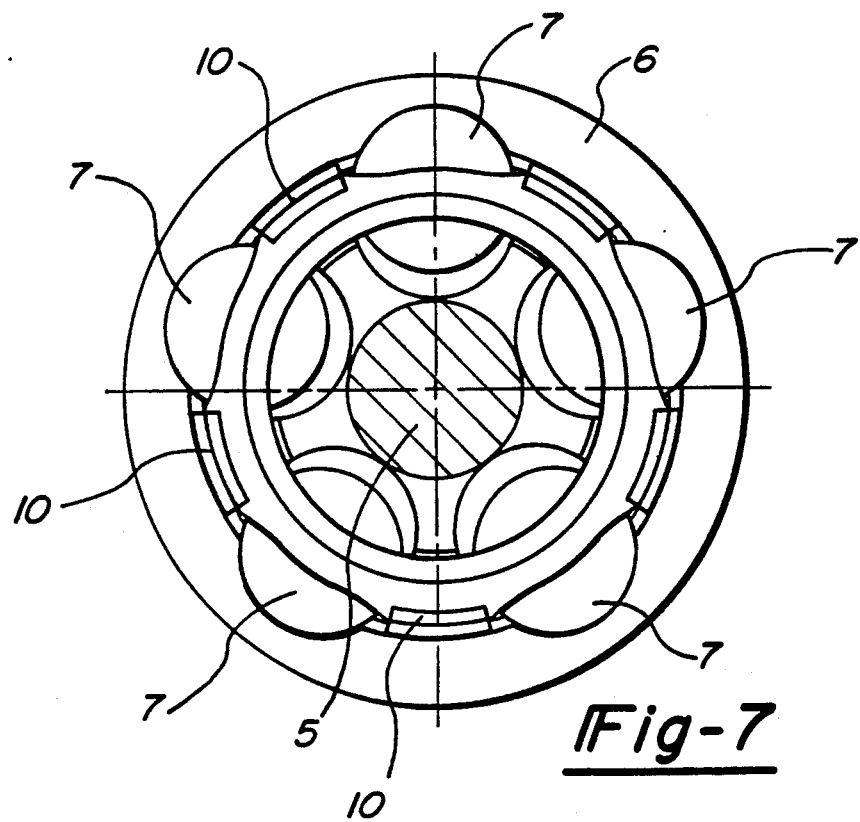
FIG. 7 is a plan view of a constant velocity universal joint.

FIG. 7 is a plan view of the joint according to FIG. 6.

Figure 8:
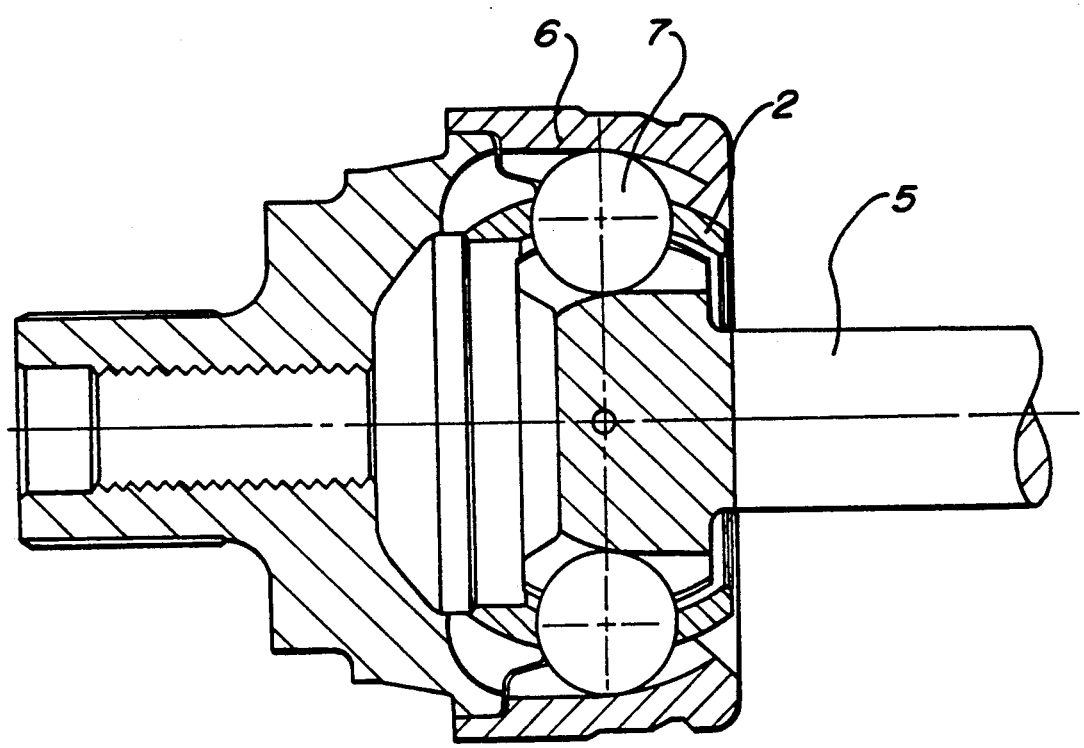
FIG. 8 shows a constant velocity universal joint comprising a two-part outer joint member.

FIG. 8 is a longitudinal section through a constant velocity universal joint in the case of which the outer joint part 6 consists of two parts in order to facilitate the assembly of the entire joint.

While the above detailed description describes the preferred embodiment of the present invention, it should be understood that the present invention is susceptible to modification, variation and alteration without deviating from the scope and fair meaning of the subjoined claims.

What is claimed is:

1. A method of assembling a constant velocity universal joint having an outer joint part with a plurality of circumferentially distributing outer running grooves, an inner joint part having a plurality of inner running grooves corresponding to said outer running grooves, a cage arranged between said inner joint part and said outer joint part having a plurality of windows corresponding to said plurality of inner and outer running grooves and a torque transmitting ball received in each of said plurality of corresponding inner and outer grooves and windows, said method comprising the steps of:

assembling said inner joint part and said cage at a relative pivot angle of up to 90° to form an inner joint assembly; and welding said inner joint part of said inner joint assembly to a shaft.

2. The method according to claim 1 wherein said welding step includes friction welding.

3. The method according to claim 1 wherein said welding step includes laser welding.

4. The method according to claim 1 wherein said welding step includes electron beam welding.

5. The method according to claim 1 further including the step of providing said shaft with a centrally arranged recess prior to said welding step.

6. A method of assembling an inner joint part, a cage and a shaft of a universal joint, said method comprising the steps of:

assembling said inner joint part and said cage at a relative pivot angle of up to 90° to form an inner joint assembly; and welding said inner joint part of said inner joint assembly to said shaft.

7. The method according to claim 6 wherein said welding step includes friction welding.

8. The method according to claim 6 wherein said welding step includes laser welding.

9. The method according to claim 6 wherein said welding step includes electron beam welding.

10. The method according to claim 6 further including the step of providing said shaft with a centrally arranged recess prior to said welding step.

* * * * *

UNITED STATES PATENT AND TRADEMARK OFFICE
CERTIFICATE OF CORRECTION

PATENT NO. : 5,330,095
DATED : July 19, 1994
INVENTOR(S) : Werner Krude, Peter Harz It is certified that error appears in the above-indentified patent and that said Letters Patent is hereby corrected as shown below:

Title Page, [30] Foreign Application Priority Data,
"4227810" should be -- 4227180--

Signed and Sealed this

Twenty-fifth Day of June, 1996

Attest:

BRUCE LEHMAN

Attesting Officer     *Commissioner of Patents and Trademarks*